United States Patent

Cordani

[11] Patent Number: 5,834,104
[45] Date of Patent: *Nov. 10, 1998

[54] FLUID ABSORPTION MAT

[76] Inventor: Peter J. Cordani, 1374 N. Killian Dr., Lake Park, Fla. 33403

[*] Notice: The term of this patent shall not extend beyond the expiration date of Pat. No. 5,506,040.

[21] Appl. No.: 629,110

[22] Filed: Apr. 8, 1996

Related U.S. Application Data

[63] Continuation-in-part of Ser. No. 238,365, May 5, 1994, Pat. No. 5,506,040.

[51] Int. Cl.⁶ .............................. A47K 7/02; B32B 7/02; B32B 7/12; B32B 27/34
[52] U.S. Cl. .............................. 428/218; 15/215; 15/216; 15/217; 428/219; 428/220; 428/302; 428/303; 428/354; 442/370; 442/395; 442/414
[58] Field of Search ..................... 428/287, 288, 428/218, 219, 220, 296, 302, 303, 346, 354; 15/215, 216, 217; 442/370, 395, 414

[56] References Cited

U.S. PATENT DOCUMENTS

| | | | |
|---|---|---|---|
| 4,609,580 | 9/1986 | Rockett | 428/198 |
| 4,650,481 | 3/1987 | O'Connor | 604/380 |
| 4,961,930 | 10/1990 | Perdelwitz | 424/411 |
| 5,506,040 | 4/1996 | Cordani | 428/218 |

*Primary Examiner*—Jenna Davis
*Attorney, Agent, or Firm*—McHale & Slavin

[57] ABSTRACT

The present invention is an inexpensive and disposable mat constructed from non-flammable material for placement beneath fluid leaking machinery. The mat is manufactured from at least one layer of non-woven fluid absorbing polypropylene that is bonded to at least one fluid impervious backing sheet such a polyester or polyethylene by use of heat sensitive adhesive. The assembled mat forms a high strength bonded mat that resists tearing and will retain fluids. The backing sheet prevents fluids from penetrating so as to confine all fluids to the non-woven portion of the mat where they disperse and, depending on the type of fluid absorbed, may evaporate.

4 Claims, 1 Drawing Sheet

FLUID ABSORPTION MAT

This is a continuation-in-part of Ser. No. 08/238,365, filed May 5, 1994, now U.S. Pat. No. 5,506,040.

FIELD OF THE INVENTION

This invention relates generally to floor coverings and, more particularly, to a floor covering device capable of retaining fluids.

BACKGROUND INFORMATION

Modern machinery is dependent upon fluids for lubrication, cooling, power transmission, and fuel. Despite advances in machinery design, it is well known that machinery has a tendency to leak fluids.

Internal combustion engines used in automobiles are prominent examples of modern machinery dependent upon fluids for lubrication, cooling, power transmission, and fuel. For instance, oil lubricates the engine, anti-freeze cools the engine, transmission oil is used in torque conversion, and gasoline or diesel is used for fuel. The fluids circulate through assorted reservoirs and transfer tubes utilizing gasket material to seal mating components. The gasket material must be chemically resistant, withstand heat, cold, and vibration under unpredictably adverse conditions. The common result is that all gaskets have a tendency to leak fluid at one time or another.

Over a period of time most automobiles leave at least one type of fluid beneath the engine compartment especially while parked. When the leaking automobile is moved the residual fluid is left in its place leaving an unsightly and dangerous condition. If the fluid that leaked is anti-freeze, cats and dogs attracted to the sweet taste of the fluid are in danger of poisoning. If the leaking fluid is oil, a danger exists of slipping on the oil if not tracking the oil onto carpeting in the home so as to deal with an infuriated spouse or parent. The stain left by the fluid on a garage floor, carport floor, driveway or other parking spot is a permanent unsightly discoloration. Many property owners who take pride in paving their driveways with tile or brick are especially troubled when automobiles drip oil onto the paving.

The leakage of fluid from internal combustion engines is not limited to automobiles as golf carts, lawn mowers, motorcycles, mopeds, go-carts, chain saws, boat engines, and the like all have a tendency to leak with the passage of time. Leakage can occur when an engine is being repaired or maintained, such as an oil change or water pump replacement. Further, leakage is not limited to engines or factory machinery as bearings in electrical motors can leak, exercise equipment can leak grease, even barbecue grills can leak grease.

Finally, the tools used to service the aforementioned machinery can be coated with fluids and when the tools are returned to a tool chest, the tools will drip the fluid coating on other tools as well as the bottom of the chest. For the reasons mentioned above, various remedies are in existence to alleviate the situation.

A common attempt to catch fluid drippings from beneath an automobile is by use of a discarded piece of carpeting placed beneath a leaking automobile. Carpeting may absorb some of the fluids but over time the fluid will seep through the carpeting and reach the floor. The fluid soaked carpeting simply covers the leaked fluids.

Limestone and cat litter are common materials used to cover and absorb fluids that have leaked from machinery. The materials effectively absorb the fluids but require spreading of the material and subsequent sweeping up for proper disposal.

Yet another attempt at holding fluid drippings is the use of plastic sheets. However, drippings of fluid onto plastic can be very dangerous as oil placed on plastic leaves a very slick surface. In addition, low density plastics can be dissolved by oil and will disintegrate when introduced to most any solvent.

Foam rubber has been sold as an absorbent material for placing beneath automobile engines. However, foam rubber is easily torn providing enhanced leakage. This is especially prevalent when used for lining tool chests, truck tool boxes, and for use as work bench mats. Such use not only requires the ability to retain fluids but also withstand abuse such as dropped tools without loss of effectiveness.

Thus, what is lacking in the art is a product that is capable of absorbing fluids without disintegrating or allowing to bleed through, does not require additional cleaning, and is capable of withstanding abuse without tearing or shedding.

SUMMARY OF THE INVENTION

The present invention is an inexpensive and disposable mat constructed from non-flammable material for placement beneath fluid leaking machinery. In the preferred embodiment, the mat is constructed from polypropylene, which has the ability to absorb engine oil, grease, fuel, transmission fluid, anti-freeze, and water as well as numerous other solutions. A non-leak, non-slip backing sheet is constructed from a 0.57 mil thick piece of clear polyester. The backing sheet is bonded to the bottom of the polypropylene and chemically treated to prevent the backing sheet from slipping.

The preferred embodiment of the instant invention is a single continuous sheet of non-woven large mesh polypropylene approximately 16 oz. per square yard in weight with a leak proof polyester backing sheet constructed of approximately 0.57 mils thick material. The polyester is secured to the polypropylene by adhesive. The actually weight of the polypropylene may range from 12 to 20 oz. per square yard with the heavier material looking and feeling like a thick black rug.

The polypropylene sheet with the polyester back has the ability to absorb numerous types of liquids including oil, gasoline, transmission fluid, anti-freeze, lacquer thinner, household products, water, and so forth. The polyester creates a leak resistant barrier thereby maintaining a fluid spill within the polypropylene web. The non-woven, large mesh polypropylene can absorb up to twenty-five times its own weight. When use to catch spills that evaporate allow the mat to be used indefinitely as the mat will maintain the fluid until evaporation with no degradation to the material. In addition, the tensile strength of the non-woven polypropylene is 350 lbs. making it nearly impossible to rip or tear even when wet, yet easily sheared with a pair of scissors.

The preferred embodiment is packaged in three different sizes. A 3'×7' sheet covers the spillage area of most automobiles by extending beneath the radiator and transmission. A smaller size such as 2'×3' can be utilized where a particular leakage problem occurs, such as beneath a power steering pump. An 18"×30" size has been found most convenient for home use. The mat can be placed beneath the water and food bowls, as well as litter boxes. In addition, this size operates well for an arts and crafts mat. As an example, a child that is putting together a model must protect the model from scratches, yet the parent wants to protect the table from glue, paint and scratches from the model.

This size also operates well for use as a handgun cleaning mat. The polypropylene maintains the oil that is dropped during the cleaning process from contacting the surface of the gun. For rifles, an 18"×54" product has been found most desirable to protect the working surface from the length of the rifle.

The polypropylene may also be colored for use in a particular application or for just providing a pleasing appearance. White works well in hospitals providing visual indication as to cleanliness.

The mat of the present invention will absorb and retain fluids when placed under leaking machinery. The backing sheet sets forth a barrier to prevent fluids from penetrating so as to confine all fluids to the mat where they disperse through a uniform non-woven fabric formed by the polypropylene material, commonly referred to throughout this specification as a large mesh and, depending on the type of fluid, may evaporate.

In an alternative embodiment, a mat is constructed of two layers of 8 to 12 ounces per square yard non-woven large mesh polypropylene bonded to each side surface of a sheet of fluid impervious polyester. The non-woven material prevents slippage on the exposed surface as well as the surface that engages the flooring. The mat is fabricated by placing a heat sensitive adhesive on each side surface of the impervious polyester wherein the large mesh sheets are heat pressed to the adhesive for permanent bonding. Upon assembly the mat exhibits a 350 plus tensile strength providing a material which resists tearing yet remains easily cut by use of a utility knife or scissor to accommodate a particular custom situation.

In yet another embodiment, the mat is constructed of one layer of 8 to 12 ounces per square yard non-woven large mesh polypropylene. The back side of the polypropylene is then treated with a solution known as polyethelene that is literally blown on. This creates the non-leak back. We then blown on to the polyethelene a product made from ethel, methyl and acetate which creates a non-slip back when used under normal conditions.

Thus, a primary objective of the instant invention is to disclose an inexpensive and disposable mat for placement beneath fluid leaking machinery.

Another objective is to disclose a mat constructed of various grades of polypropylene capable of absorbing at least ten times its weight in fluids so as to leave a visual surface that is unaffected by fluid drippings and provides a barrier to fluids by inclusion of a barrier constructed of fluid resistant material.

Still another objective is to disclose a mat having fluid absorption, sound deadening, and reversible properties for use in lining tool boxes and covering work benches.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms a specific embodiment, it will be readily apparent to those skilled in this art that various modifications, rearrangements and substitutions can be made without departing from the spirit of the invention. The scope of the invention is defined by the claims appended hereto.

Figure 1:
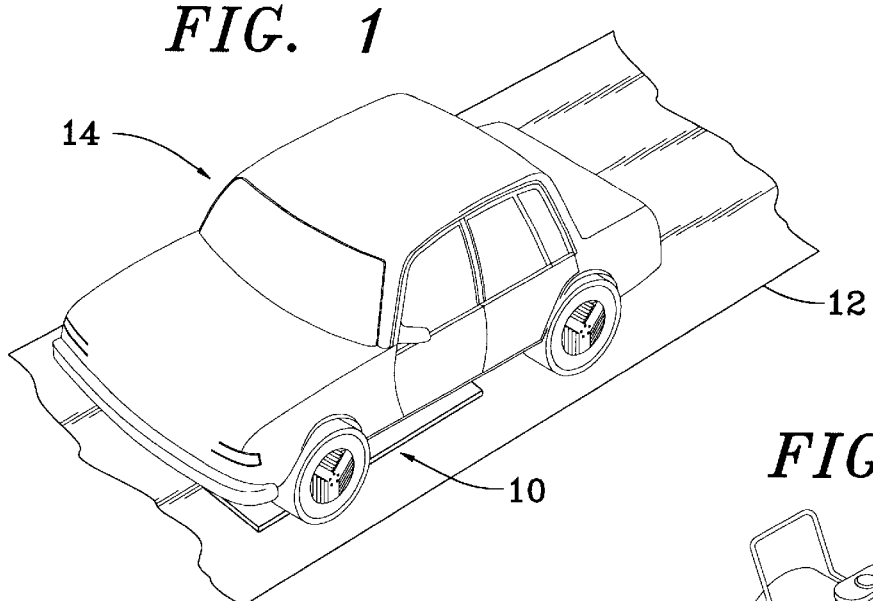
FIG. 1 is a pictorial view of the instant invention placed beneath an automobile for catching fluids.

Now referring to FIG. 1, shown is a pictorial view of the fluid absorption mat 10 placed on pavement 12. Foam adhesive tape tabs are used to secure the mat in breeze ways such as car ports by providing an adhesive attachment to the pavement. The mat 10 protects the pavement 12 from fluid drippings such as oil, anti-freeze, transmission oil, diesel fuel and so forth that may drop when an automobile 14 is parked thereon.

Figure 2:
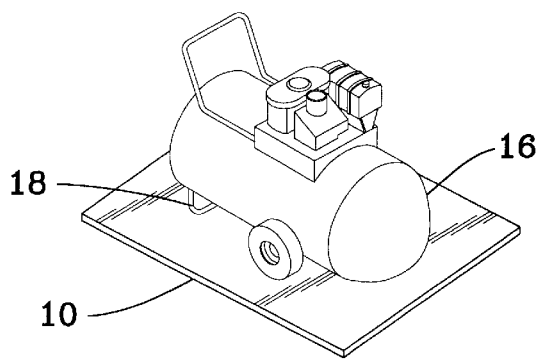
FIG. 2 is a pictorial view of the instant invention placed beneath an air compressor for catching drippings and noise dampening.

FIG. 2 is a pictorial view of an air compressor 16 placed upon a fluid absorption mat 10. In this use the mat 10 is available to collect fluid drippings from the compressor 16 as well as operate to reduce vibration and noise that harmonize from the compressor through the support stand 18. The preferred embodiment of the mat 10 utilizes a larger mesh for placement against pavement which prevents moisture buildup. The mesh allows air flow to promote drying should the mesh be subjected to moisture such as rain water, floor condensation permeation, flooding, or the like moisture saturation.

Figure 3:
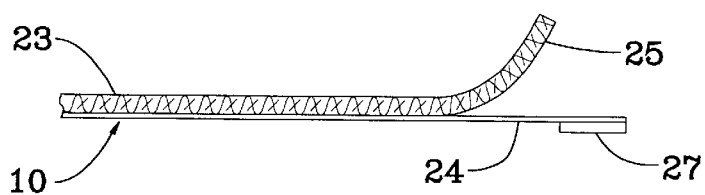
FIG. 3 is a partial cross-sectional side view of a mat constructed from polypropylene with a backing sheet.

Now referring to FIG. 3, the preferred embodiment of the instant invention is depicted wherein fluid absorption mat 10 is shown with a first sheet 23 of non-woven polypropylene material having approximately 12 to 20 ounces per square yard, preferably 16 ounces such as that manufactured from the Merge #L17917 with #5 Denure Fiber which is a needle punching process of fibers as produced from Amaco Fabrics. The second sheet 24 is an impervious backing sheet of approximately 0.57 mils thick of clear polyester. A layer of 2.4 mils of thermal activated adhesive is placed between the sheets and permanently bonds the sheets together by subjection to pressure and heat. The underside of the product is treated with 0.75 mils of a vinyl copolymer solution such as identification #1060 which is an identification number of the General Binding Corporation for a thermal active EVA adhesive. The non-slip back is optional as the polyester may be considered non-slip depending upon the support base to create a non-slip back.

As an example, if an automobile leaks oil the mat may be placed beneath the engine and when oil is deposited onto the polypropylene mesh 23, the oil will soak into the mesh and disperse along the backing surface. This will leave the surface of the mesh clean by concealing the oil from view. The second sheet 24 will lay flat on the floor and can be secured to the floor by the use of two-sided foam tape 27 to prevent movement if used in drafty areas such as car ports. The backing sheet is treated with 0.75 mils of a vinyl copolymer solution such as Identification #1060 to create a non-slip back.

Figure 4:
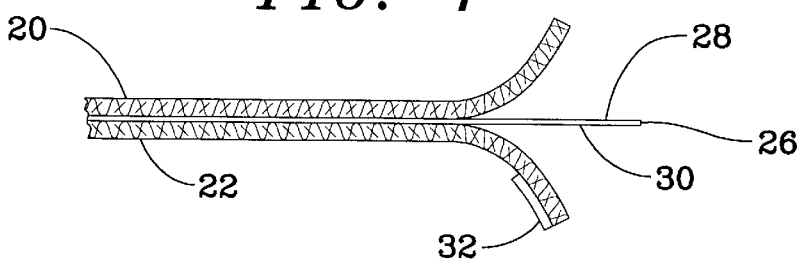
FIG. 4 is a partial cross-sectional side view of a mat constructed from two layers of polypropylene with a backing sheet between polypropylene; and is

Now referring to FIG. 4, the fluid absorption mat 20 is shown with a first sheet 20 of non-woven 8 to 15 ounces polypropylene. A second sheet 22 of non-woven 8 to 15 ounce per square yard of polypropylene is also shown. Between the first sheet 20 and the second sheet of 22 is positioned an impervious bonding sheet 26 of clear polyester having an upper surface 28 and a lower surface 30 coated with thermal activated adhesive for permanently bonding by use of heated rollers which apply both heat and pressure during assembly or is simply set by pressure rollers.

During use, oil is deposited onto the mesh 20, the oil will soak into the mesh and disperse along the side surface 28 of the bonding sheet 26. This will leave the surface of the mesh clean by concealing the oil from view. The second sheet 22 provides air gap beneath the mat to prevent moisture buildup. In addition, the use of a second sheet that assimilates the primary sheet 20 provides for reversibility allows the use of both sides for situations of minimal fluid absorption such as for use in lining of a tool chest and the like. The second sheet 22 will lay flat on the floor and can be secured thereto by use of two-sided foam tape 32.

Figure 5:
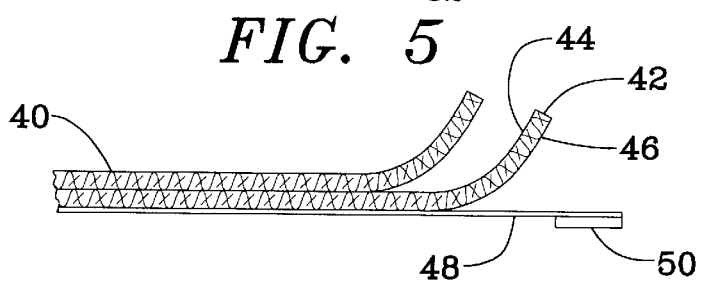
FIG. 5 is a partial cross-sectional side view of a mat constructed from one layer of polypropylene with two backing sheets.

Now referring to FIG. 5, still another alternative embodiment of the fluid absorption mat is shown with a first sheet 40 of 8 to 15 ounce per square yard non-woven polypropylene base. A second sheet 42 of at least 1 mill of blown polyethelene is also shown. In this embodiment a lower sheet 48 is constructed of ethel, methyl and acetate that is also blown on which provides a non-slip base that resists slipping. Either embodiment will allow the mat to lay flat on the floor and be secured thereto by use of two-sided foam tape 50.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A disposable fluid absorption mat comprising:
    a sheet of non-woven absorbent polypropylene defined by a top side surface and a bottom side surface bounded by a peripheral edge having a basis weight of approximately 16 oz. per square yard;
    a backing sheet constructed of approximately 0.57 mils thick of polyester secured to said bottom side surface of said sheet by adhesive; and
    at least one piece of two-sided foam tape attached to an outer surface of said polyester for securing said mat in a fixed position relative to a surface to be protected.

2. The absorption mat according to claim 1 wherein said adhesive is thermal activated and permanently bonds said polyester to said polypropylene upon the simultaneous application of heat and pressure.

3. The absorption mat according to claim 1 wherein said polypropylene is colored.

4. The absorption mat according to claim 1 wherein said polyester includes a coating of non-skid material.

* * * * *